Aug. 12, 1924.
J. C. RORISON
CHART
Filed Feb. 13, 1922   2 Sheets-Sheet 1
1,504,271
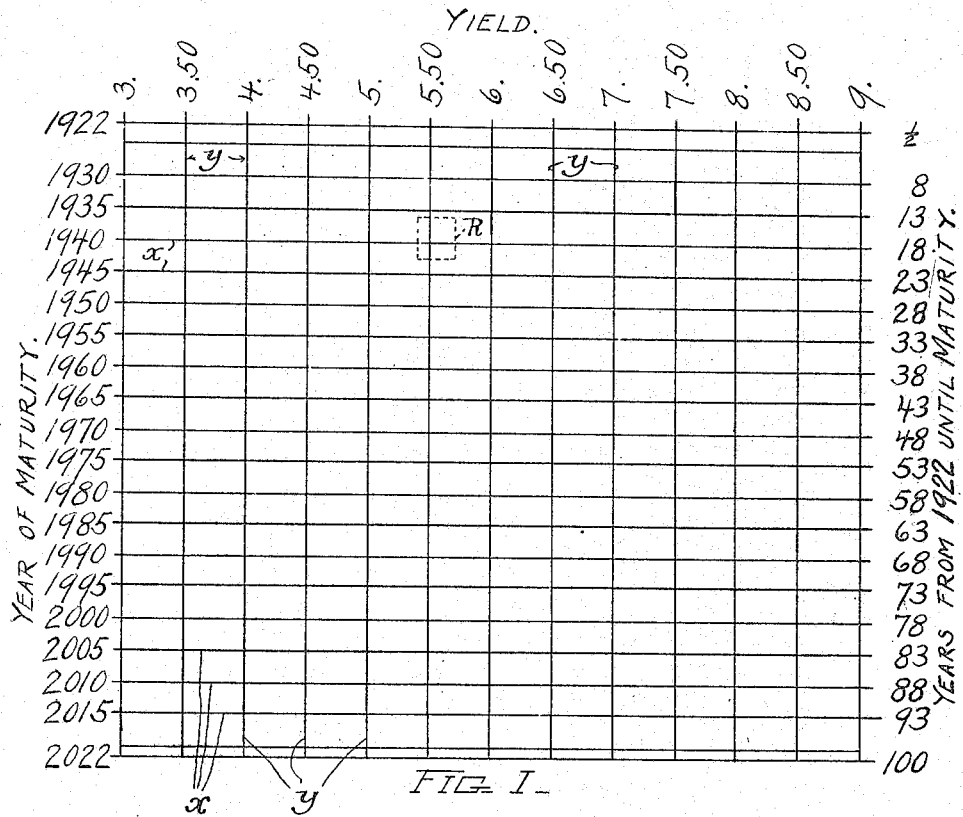
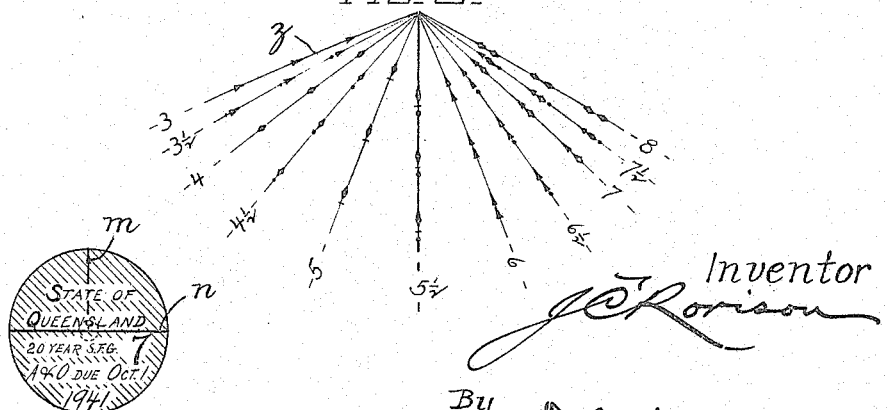
Inventor
J C Rorison
By D. Anthony Usina
Attorney Aug. 12, 1924.  
J. C. RORISON  
CHART  
Filed Feb. 13, 1922  
1,504,271  
2 Sheets-Sheet 2

Inventor  
J. C. Rorison  
By D. Anthony Usina  
Attorney

Patented Aug. 12, 1924.

1,504,271

UNITED STATES PATENT OFFICE.

JOHN CHADBOURN RORISON, OF NEW YORK, N. Y.

CHART.

Application filed February 13, 1922. Serial No. 535,995.

*To all whom it may concern:*

Be it known that I, JOHN CHADBOURN RORISON, a citizen of the United States, and resident of the city, county, and State of New York, have invented certain new and useful Improvements in Charts, of which the following is a specification.

This invention relates to charts for visually indicating the comparative yields on various classes of investments and also for showing at a glance the general state of the security market. The invention as herein illustrated is particularly adapted to the bond business, but can readily be applied to various other business, such as stocks, mortgages, insurance and similar investment activities.

One object of the invention is to provide means whereby quick comparison between various issues of securities can be made.

Another object is to provide means whereby the yield on any security can be readily determined.

A further object is to provide means whereby the different classes of securities listed can be readily distinguished.

Another object is to provide means whereby the maturities of various investments can be readily shown.

Further objects will be apparent from the following description when read in connection with the accompanying drawings in which Fig. 1 represents very diagrammatically a chart covering a period of 100 years for securities yielding from 3% to 9%; the price curves and certain lines being omitted in the interest of simplicity of illustration;

Fig. 2 is a detail view showing price curves of distinctive character to represent different interest or coupon rates;

Fig. 3 is a plan view of a movable marker utilized to designate a given security;

Figure 4:
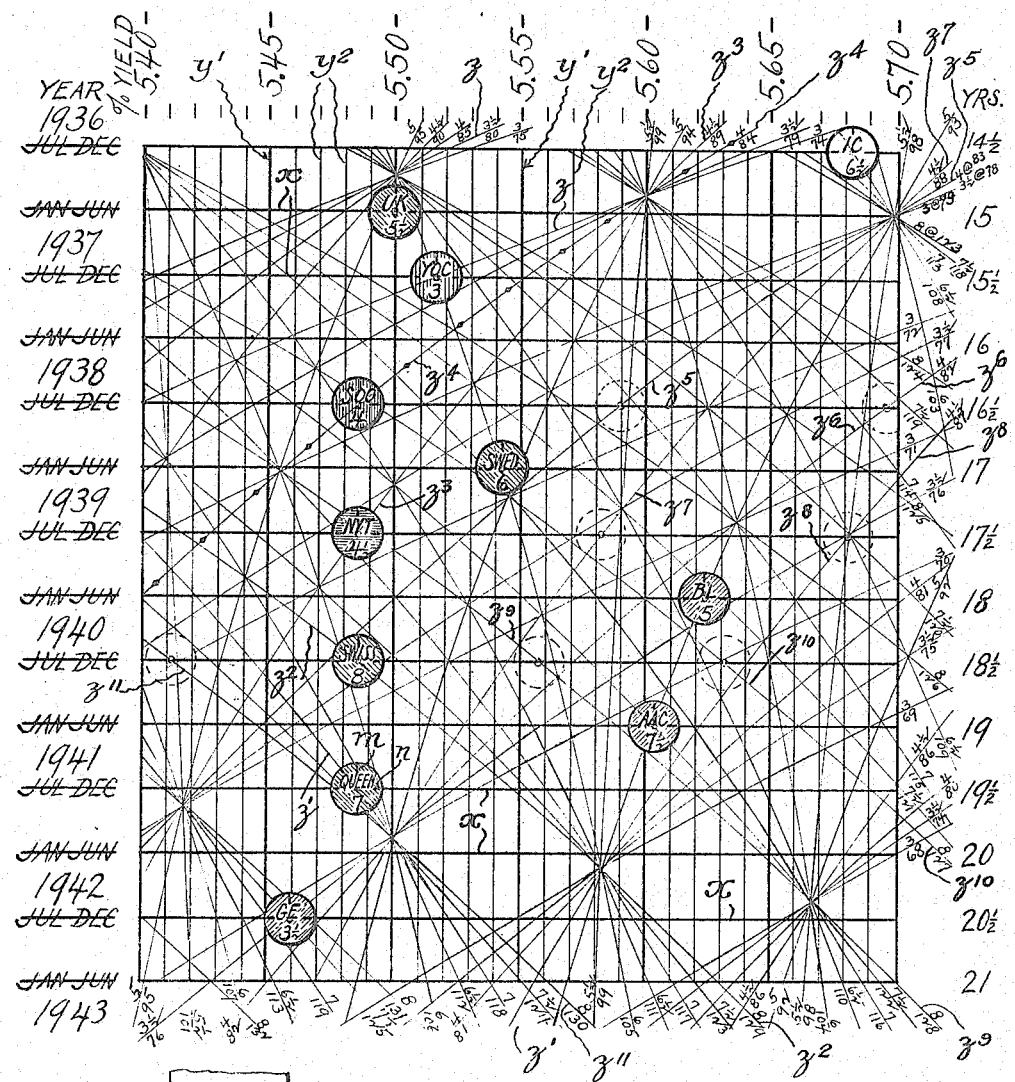
Fig. 4 is a full size view of a portion of Fig. 1 showing in detail various price curves, maturity lines and yield lines delineated on the chart, and also showing several movable markers corresponding to various securities. The portion illustrated in this figure corresponds to the dotted rectangle R shown in Fig. 1.

Referring first to Fig. 1 the chart is divided into a multiplicity of horizontal spaces by lines designated 1922–2022 inclusive, representing the years of maturity of various securities. In this figure the horizontal maturity lines $x$ represent chiefly five year intervals. In the chart as actually used, however, the maturity lines are usually drawn to represent half year intervals as shown in the larger detail, Fig. 4, but may, if desired, be drawn to represent any convenient periods. The chart is divided vertically by a number of lines $y$ representing different percentages of yields on investments. The spacing between the vertical yield lines in Fig. 1 corresponds to a yield of one-half of one percent, but in actual practice the chart is ruled with heavy lines $y'$, Fig. 4, spaced to represent the difference in yield of 5/100 of 1%, and the space between these heavy lines is divided by lines $y^2$ into five equal parts each part of which represents 1/100 of 1%. While it has not been shown in Fig. 4 in actual practice the space between the lines $y^2$ is divided into five equal parts representing 1/500 of 1%.

A multiplicity of price curves $z$ are plotted on the chart corresponding to securities of various market values at various coupon rates. These curves are so plotted that they intersect the maturity lines $x$ at points which correspond to the yield on the security at the given coupon rate.

The generally accepted practice assumes that the proceeds of the coupons, (or of the interest payments), as the coupons mature, (or as the interest dates come due), are reinvested at the same income rate which the bond yields at its purchase price. This basis has been taken into consideration in calculating and plotting the price curves on this chart.

There is a separate line $z$ for each different market price and the market prices are printed adjacent to the several lines $z$. These lines are delineated so that the coupon rate can be readily distinguished. For example, in Fig. 2 price curves $z$ for a 3% bond is indicated by a curve having small three-sided figures printed along its length; a 3-1/2% bond is designated by a three-sided figure having a dot adjacent thereto; a 4% bond by a line with four-sided figures along its length; a 5% bond by a four-sided figure and a dash through the line and so on; an 8% bond being indicated by two adjacent four-sided figures as indicated in Fig. 2. For simplicity of illustration the characteristic markings on the price curves have been omitted in Fig. 4, from all curves excepting the one representing a 4% bond selling at 84. In this figure the coupon rates and selling prices have been indicated at the termination of the price curves along the borders of the figure in the interest of clearness.

Along one side of the chart is a series of figures showing the dates of maturity of different bonds, and above each year figure is printed the abbreviation Jan. to Jun. indicating that a bond marked on the corresponding maturity line $x$ falls due between January and June inclusive or in other words, the first half of the corresponding year. Below each year figure is printed the abbreviation Jul. to Dec. to indicate that the bond falls due between July and December inclusive of that year. At the right side of the chart is printed a series of figures representing the difference in time between the current year and the maturity date printed at the left side of the chart. For example, considering the July to December line for the year 1937; on the right side of the chart it will be seen that the numeral 15-1/2 indicates that from the first half of the year 1922 to the last half of the year 1937 is 15-1/2 years. Therefore, any bond falling due in the latter part of 1937 has 15-1/2 years to run and this can be very quickly learned by glancing at the chart.

Figure 5:
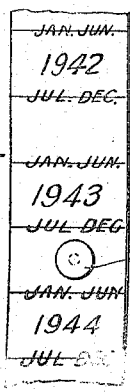
Fig. 5 is a detail of a movable strip adapted to be used in connection with the chart.

To perpetuate the chart the maturity dates shown at the left in Fig. 4 will usually be printed on a movable strip S such as shown in Fig. 5 and this strip will be moved up one space every six months to keep the chart up to date. The strip will be fastened in place by a thumb tack $t$ or the like. At the same time the movable markers will be moved up along their respective price curves $z$ so that they lie on the proper maturity lines. The figures representing the years to maturity, printed at the right of the chart, of course, remain fixed and correctly indicate the time intervals between the current year and the different years of maturity.

The various securities dealt in by a bond broker or other investment houses will usually be designated by a movable marker such as illustrated in Fig. 3. This marker is preferably in the form of a thumb tack having descriptive matter thereon relating to the particular bond in question. Preferably the marker has printed thereon lines $m$ and $n$ perpendicular to each other, which are useful to properly position the marker in parallel relation to the maturity lines $x$ and the yield lines $y$. The marker illustrated in Fig. 3 represents a 7%, 20 year, sinking fund, gold bond, issued by the State of Queensland to mature in the year 1941. The abbreviations "A & O, due Oct. 1" indicate that the interest is payable in April and October, and that the bond is payable on October 1st, 1941. This particular bond is designated on Fig. 4 by the marker designated "Queen 7", and it will be seen that this lies on the maturity line corresponding to the second half of the year 1941. It will also be seen that it is on the price curve $z'$ which is designated 7/118 which indicates that this is a 7% bond selling at 118. The line $m$ on the marker lies half way between two vertical yield lines $y^2$ and, therefore, it can be readily determined, by counting the three spaces and the half space to the right of the nearest heavy line $y'$ which is marked 5.45%, that the bond yields approximately 5.485%.

Considering the bond shown next above in Fig. 4, designated "Swiss 8" it will be seen that this bond lies on the price curve marked $z^2$ which represents an 8% bond selling at 129. This bond will also yield approximately 5.485% as will also the bonds marked "NYT 4-1/2" and "SOO 4", these markers lying on the price curves $z^3$ and $z^4$ respectively representing a 4-1/2% bond selling at 89, and a 4% bond selling at 84. Thus it will be appreciated, that at a glance the chart shows that these bonds of various coupon rates and maturing at different time intervals return the same yield on the investment.

The movable markers are either colored, shaded or shaped in some distinctive way to indicate the class of security. For instance in Fig. 4 the bonds designated GE, BL, AAC, are shaded similarly to represent industrials, which in practice are purple. The Government bonds marked QUEEN, SWISS, SWED, UK, are all shaded to represent green. The public utility bond NYT is shaded to represent blue. The legal railroad bonds, for example, SOO and YOC are shaded to represent red. Or markers representing different classes may be shaped, for example, square, triangular, octagonal and so forth. In this way a very quick comparison between different types of bonds can be made.

The chart will contain a great number of price curves, $z$, $z'$, $z^2$ and so forth, corresponding to all probable selling prices at all probable coupon rates. And the intersection of any given price curve at a given coupon rate with maturity lines will indicate the yield at that particular rate and price as will be understood.

The selling prices of bonds and other securities fluctuate from time to time and the movable markers will be moved along their respective maturity lines at such times so that they lie on the price curve corresponding to the current market price and coupon rate. For example, the bond "SOO 4" is shown in full lines on the price curve $z^4$ for a 4% bond selling at 84. And at this price as indicated above the bond yields approximately 5.485%. If it should sell at 83 the marker SOO would be moved along its maturity line to the price curve $z^5$ representing a 4% bond selling at 83 (the first dotted position to the right). This intersects the Jul. to Dec. maturity line for the year 1938 at a point which indicates that the bond will yield approximately 5.59%. Or if this bond sold at 82 the marker would be moved to the price line $z^6$ for a 4% bond selling at 82 as shown at the extreme right dotted position which shows a yield of approximately 5.696%.

I have indicated in similar manner the movements of the "NYT 4-1/2" in full lines selling at 89. on the line $z^3$ and in dotted lines selling at 88 on the line $z^7$ at which it yields approximately 5.5825%, and on the line $z^8$ representing a 4-1/2% bond selling at 87 at which it yields approximately 5.681%. In a similar way the movements of the marker, for the bond marked "SWISS 8" is shown, the price lines $z^9$ and $z^{10}$ representing 8% bonds selling respectively at 128 and 127 and yielding approximately 5.5575% and 5.631%. Another position of this marker is indicated to the left of the full line position showing the marker located on the price curve $z^{11}$ assuming the bond to sell at 130, which will indicate that at this price the bond will yield approximately 5.4137%.

The bond marked "UK 5-1/2" is selling at par and, therefore, yields exactly 5.50%. There are no price curves corresponding to the bonds selling at par, the lines represent the price curves for issues at par being coincident with the yield lines, as will be understood.

From the above it will be apparent that a quick comparison of the relative value of different bonds may be readily made by observing the location of the markers corresponding to these bonds on the chart. The yield basis upon which a security sells is usually an index of the strength of the security. The lower the yield of any particular issue, the higher the grade in the market or public opinion. With this in mind, it can readily be seen at a glance that the bond marked "GE 3-1/2" (Fig. 4) would be considered the soundest purchase. The four bonds marked respectively "QUEEN, SWISS, NYT and SOO" are of the next grade as far as they can be judged by their yield. If an investor is partial to any particular type of security, the colors or other characteristics of the markers will indicate at a glance the comparative standing of the different bonds in the particular class of security he is interested in.

The device can also be used as a bond yield table which will at a glance give the yield on securities at many different prices and coupon rates, thus making it possible to obtain, with a great degree of accuracy and speed, the yield of any standard coupon rate of a bond at any probable price. To use the device as a yield table the operator can follow with a stylus along the maturity line of any particular bond until he comes to the price curve corresponding to the market value of the selected bond at its given coupon rate. The intersection of this price curve with the maturity line will lie on or between certain of the yield lines $y$ from which the percentage of yield can be readily read. The device will enable an investor to determine at a glance just what issue or issues are the best investment according to his particular needs, or what issue or issues are the most desirable for him to dispose of. The device is also a cross-index of all active issues. For any year or years it can be learned at a glance by reading from left to right or vice versa which are the higher or lower grade of securities, remembering that the lower the yield the higher the grade. Or reading from top to bottom one can quickly learn which securities have the earlier or later maturities.

Heretofore in order to determine the yields of bonds at different coupon rates it has been necessary to resort to different tables usually made up in books of many pages and containing a great number of figures. In order to make a comparison of yields on different securities at different prices and coupon rates, it has been necessary to examine such tables with care, making notes and interpolations. This takes time and involves considerable labor.

My device saves at least three distinct steps in yield figuring. First, the computing of the difference in time between the current year and the date of maturity of the particular issue in question. Second, locating in the tables of bond values the printed figures representing the rough approximations of yield, and third, interpolating the yield from the above mentioned printed figures.

With my device the comparative values and characteristics of a great number of securities can be quickly ascertained and the whole state of the security market can be easily visualized. The distinctive markers enable investors, dealers or brokers to compare various securities in the same class with one another and also with securities in other classes.

While I have described my invention with particular reference to a chart for indicating various particulars relating to bond issues, it is to be understood that the invention is not limited to such use as it is well adapted to also enable one to compute the return on various investments, such as stock, cotton and grain futures, or in fact on any security where the values are subject to change from time to time.

What I claim is:

1. A chart having delineated thereon maturity lines indicating time intervals, yield lines at an angle thereto indicating percentages of return on securities, and a plurality of price curves designating market prices of various securities at various coupon rates, said price curves being plotted so that they intersect said maturity lines at points which indicate the yields of given securities at given coupon rates.

2. A chart having delineated thereon parallel maturity lines indicating time intervals, parallel lines perpendicular thereto indicating percentages of yields and a plurality of price curves corresponding to various market values and various coupon rates of securities, said price curves being plotted so that a given price curve of a given coupon rate intersects said maturity lines at points which indicate the yields of a security at the given market price.

3. A chart having two sets of lines delineated thereon at an angle to each other, one set of lines indicating percentages of yield on securities, and the other set representing other particulars relating to securities and price curves of distinctive character which indicate different coupon rates, said curves intersecting said lines at points which indicate the yield of a given security at the coupon rate represented by a given curve of distinctive character.

4. A chart as defined in claim 1 in which the price curves are distinctively delineated to indicate the coupon rates thereof.

5. A chart as defined in claim 4 in which the maturity and yield lines are perpendicular to each other.

6. A device of the class described including a chart having price curves, yield lines and maturity lines delineated thereon, and movable markers whereby the intersections of said price curves with said maturity and yield lines can be vividly indicated.

7. A device of the class described including in combination movable markers, and a chart having lines and price curves delineated thereon whereby the movement of a marker to an intersection of certain of said lines and curves will indicate variable resultant readings.

8. A chart according to claim 1 in combination with movable markers adapted to identify securities and vividly indicate the intersections of the price curves with the yield lines.

9. A chart according to claim 1 in combination with movable markers representing different securities and having descriptive matter thereon relating to said securities.

10. A device of the class described including a chart having price curves, yield lines and lines at right angles to said yield lines indicating characteristics of securities and a plurality of descriptive movable markers representing different securties, said markers being colored to designate different classes of securities.

11. A device of the class described including a chart having price curves, yield lines and lines at right angles to said yield lines indicating characteristics of securities and a plurality of descriptive movable markers representing different securities the markers representing securities of the same class having similar appearance.

12. A device of the class described including a chart having price curves, yield lines and maturity lines at right angles to said yield lines, and a marker comprising a member having descriptive matter thereon to identify a security and lines to assist in taking readings from the chart.

13. A chart of the character described having maturity lines, yield lines and a multiplicity of price curves thereon, said price curves representing different market values and different coupon rates of securities and being superimposed on the same surface so that the characteristics of different securities at different prices and rates can be quickly determined by observation.

14. A chart of the character described having maturity lines, yield lines and price curves thereon, said chart having a series of numbers printed at one side thereof in alignment with the maturity lines indicating the time intervals between the current year and different dates of maturity, and movable strips having numbers corresponding to years of maturity printed thereon and adapted to be shifted at different intervals to perpetuate the chart.

In witness whereof, I have hereunto signed my name.

JOHN CHADBOURN RORISON.